United States Patent
Arisumi et al.

(10) Patent No.: US 10,048,689 B2
(45) Date of Patent: Aug. 14, 2018

(54) POSITION CONTROL SYSTEM AND POSITION CONTROL METHOD FOR AN UNMANNED SURFACE VEHICLE

(71) Applicant: National Institute of Advanced Industrial Science and Technology, Tokyo (JP)

(72) Inventors: Hitoshi Arisumi, Tsukuba (JP); Shin Kato, Tsukuba (JP)

(73) Assignee: NATIONAL INSTITUTE OF ADVANCED INDUSTRIAL SCIENCE, Tokyo (JP)

( * ) Notice: Subject to any disclaimer, the term of this patent is extended or adjusted under 35 U.S.C. 154(b) by 20 days.

(21) Appl. No.: 15/261,713

(22) Filed: Sep. 9, 2016

(65) Prior Publication Data
US 2017/0212516 A1   Jul. 27, 2017

(30) Foreign Application Priority Data
Jan. 27, 2016 (JP) .................................. 2016-013724

(51) Int. Cl.
*B60W 20/14*  (2016.01)
*G05D 1/02*  (2006.01)
(Continued)

(52) U.S. Cl.
CPC .......... *G05D 1/0206* (2013.01); *B63B 21/16* (2013.01); *B63B 2021/007* (2013.01); *B63B 2035/006* (2013.01); *B63B 2211/02* (2013.01)

(58) Field of Classification Search
CPC ...... G05D 1/0206; B63B 21/50; B63B 35/00; B63B 2035/006; B63B 2008/002;
(Continued)

(56) References Cited

U.S. PATENT DOCUMENTS

| | | | | |
|---|---|---|---|---|
| 7,692,328 B2* | 4/2010 | Yoshida | ................... | B63G 8/08 307/9.1 |
| 8,701,584 B2* | 4/2014 | Kalwa | ..................... | B63G 8/38 114/313 |

(Continued)

FOREIGN PATENT DOCUMENTS

JP   2015-000596 A   1/2015

OTHER PUBLICATIONS

Conway, ROV Mantis: A Dual-Purpose Underwater Vehicle, 1986, IEEE, p. 418-421.*

(Continued)

*Primary Examiner* — McDieunel Marc
(74) *Attorney, Agent, or Firm* — Workman Nydegger

(57) ABSTRACT

An unmanned surface vehicle for underwater investigation that is free from negative effect of a thruster is provided. A position control system for an unmanned surface vehicle includes: at least one mooring device fixed on the ground; a wire fed and wound from the mooring device; an unmanned surface vehicle connected at the tip end of the wire; and at least one rudder equipped on the unmanned surface vehicle, wherein the mooring device includes a mooring device control device for controlling the feeding and winding of the wire, and a rudder control device for drive-controlling the rudder, the mooring device control device and the rudder control device control the position of the unmanned surface vehicle to reach the target.

9 Claims, 17 Drawing Sheets

(51) Int. Cl.
  *B63B 21/16* (2006.01)
  *B63B 35/00* (2006.01)
  *B63B 21/00* (2006.01)
(58) Field of Classification Search
  CPC .......... B63H 25/38; B63G 8/18; B63G 8/001; B63G 8/38; G01V 1/38; G01V 1/3843; B60W 20/14; F02D 41/3058; F02D 41/3076; F02D 41/26; F02P 5/045; B60K 6/44
  USPC .......................................................... 701/21
  See application file for complete search history.

(56) References Cited

U.S. PATENT DOCUMENTS

| | | | | |
|---|---|---|---|---|
| 8,773,947 | B2* | 7/2014 | Payor | G01V 1/38 181/101 |
| 8,908,476 | B2* | 12/2014 | Chun | B63G 8/001 114/312 |
| 9,051,036 | B2* | 6/2015 | Kim | B63G 8/001 |
| 9,733,378 | B2* | 8/2017 | Carcaterra | G01V 1/3843 |
| 2010/0311325 | A1* | 12/2010 | Marshall | H04B 13/02 455/40 |
| 2012/0055390 | A1* | 3/2012 | Kalwa | B63G 8/001 114/312 |
| 2012/0113756 | A1* | 5/2012 | Carcaterra | G01V 1/3843 367/144 |
| 2014/0090590 | A1* | 4/2014 | Maurer | B63G 8/18 114/330 |

OTHER PUBLICATIONS

Gong-Xing et al., Design of the Intelligence Motion Control System for the High-speed USV, 2009, IEEE, p. 50-53.*
Lee et al., Development of a Highly-Maneuverable Unmanned Underwater Vehicle Having an RF Communication Buoy, 2011, IEEE, p. 1-6.*
Pereira et al., An Experimental Study of Station Keeping on an Underactuated ASV, 2008, IEEE, p. 3164-3171.*
Spears et al., Under Ice in Antarctica the Icefin Unmanned Underwater Vehicle Development and Deployment, 2016, p. 30-41.*
Hitoshi Arisumi et al., *Reconfigurable Robot System for Underwater Investigation, Proceedings of the 2015 JSME Conference on Robotics and Mechatronics*, Kyoto, Japan, May 17-19, 2015, 4 pages (partial translation).

* cited by examiner

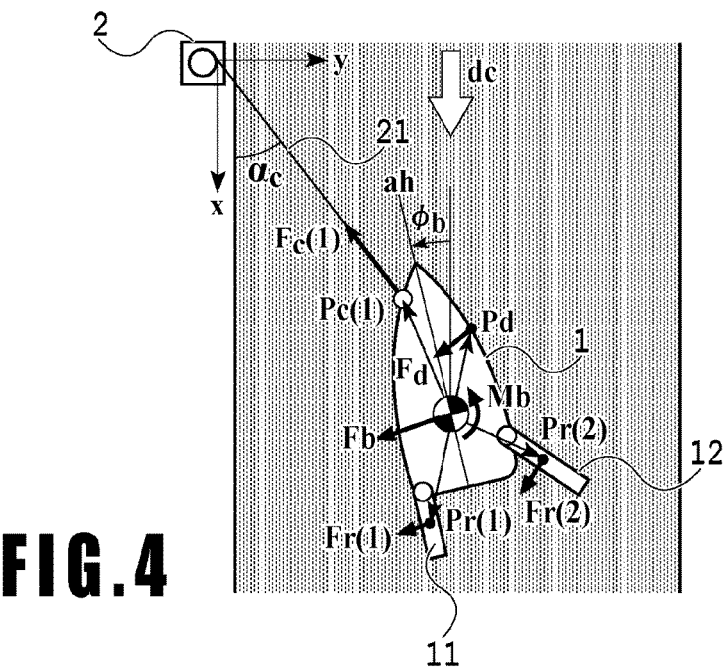
FIG.4
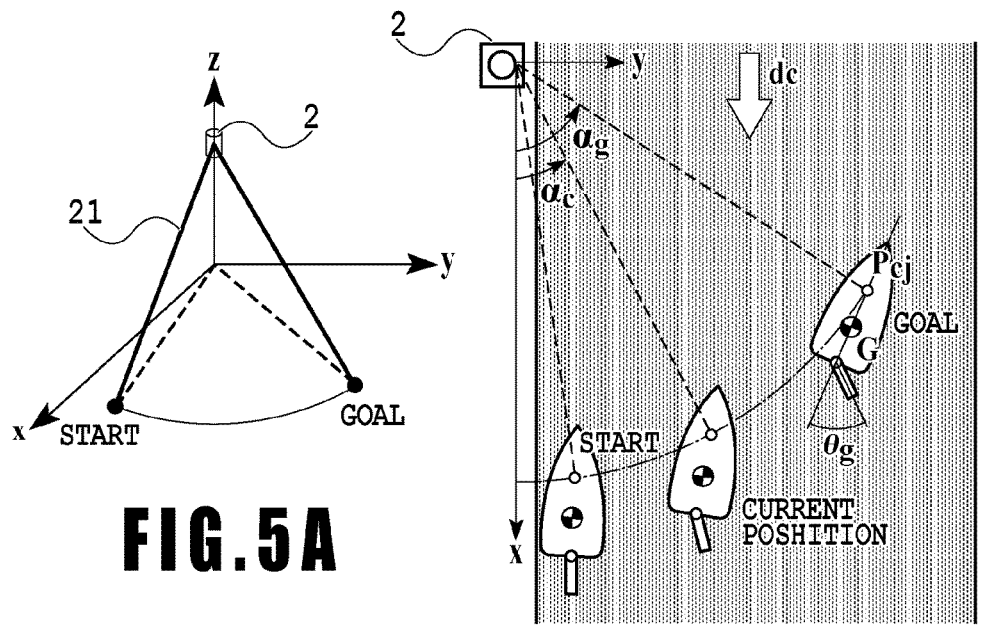
FIG.5A
FIG.5B

POSITION CONTROL SYSTEM AND POSITION CONTROL METHOD FOR AN UNMANNED SURFACE VEHICLE

CROSS-REFERENCES TO RELATED APPLICATIONS

This application claims the benefit of Japanese Patent Application No. 2016-013724, filed Jan. 27, 2016, which is hereby incorporated by reference herein in its entirety.

BACKGROUND OF THE INVENTION

Field of the Invention

The present invention relates to the position control of an underwater investigation robot used for inspecting submerged structure in running water environments. In particular, the invention relates to the position control system and the position control method for the unmanned surface vehicle (USV) with one or more rudders moored by a wire from a reel system mounted on a fixed place such as a riverbank.

Description of the Related Art

Investigation targets of river facilities include a river bed, a revetment, a retaining wall, a dike, a bridge pier, an abutment, or a weir gate. These targets are adversely influenced by a change of the water level or water flow of the river. For example, if the river bed is scoured around the foundation of the pier or abutment of a bridge spanning a river due to water flow, then the bridge may consequently collapse. If the revetment or dike is permeated by swelling water or deeply eroded by the flow, then it may burst. In order to prevent these problems, the inspection of the river facilities has been conventionally carried out by a person riding in a boat with an underwater camera or staffs or by a diver in running water to see the target directly. However, these conventional approaches have the following drawbacks: a high investigation cost and an impracticability of the inspection during a rapid flow or swollen river because of guaranteeing a person's safety, and an insufficient number of inspectors such as divers compared to the number of river facilities which are needed to investigate. The automatic inspection system based on robot technology to inspect submerged infrastructure such as a river bank or a pier of a bridge crossing a river has not well developed due to difficulties to control the system in the running water of the river.

The present inventors have already proposed variable-structure robot system for underwater investigation in the following paper; Hitoshi ARISUMI, et al., "Reconfigurable robot system for underwater investigation—Grasping riverbed condition by unmanned sailing boat—," Proceedings of the 2015 JSME Conference on Robotics and Mechatronics, Kyoto, Japan, May 17-19, 2015. The reconfigurable robot system consists of several modules such as surface/underwater robots or sensor devices those are combined depending on the working environment or task.

FIGS. 1A to 1D illustrate the basic configuration of the conventional reconfigurable robot for underwater investigation. An unmanned surface vehicle 1 has an environmental measuring system 191 such as a pan-tilt camera with LED 194, or a sonar sensor 195 or laser range sensor. (see FIG. 1A) An unmanned surface vehicle 1 has a reel mechanism 193 hanging an environmental measuring system 191 or an underwater robot 155 via an underwater cable 192. (see FIGS. 1B and 1C) An unmanned surface vehicle 1 is controlled by a computer processing apparatus 201 on land via a wireless communication system 202. An unmanned surface vehicle 1 is moored by a wire unwound from a reel system 197 on land or fixed to bottom by an anchor 198. An unmanned surface vehicle 1 has the various environment measuring systems MES as shown in FIGS. 1A to 1C. (see FIG. 1D)

FIG. 2 illustrates a configuration example of the conventional reconfigurable robot that investigates underwater environments such as dam body or lake bed as an actual task. The reconfigurable robot consists of an unmanned surface vehicle 1a, 1b with a thruster, wire feeding and winding apparatus equipped in the unmanned surface vehicle, and an underwater robot 155 linked to the unmanned surface vehicle or a towed underwater camera 154. An unmanned surface vehicle 1a, 1b communicates a communication system 211 on land.

FIG. 3 illustrates a configuration example of the conventional reconfigurable robot that investigates underwater environments in running water such as foundation of a pier of a bridge across a river or a river dike as an actual task. The reconfigurable robot consists of a mooring device 2 on land, a wire 21 fed and wound from the mooring device 2, the unmanned surface vehicle 1 with a thruster connected to a tip end of the wire 21, and a towed underwater camera 154. The towed underwater camera 154 observes a scour situation 173 of the pier foundation 172 of the bridge 171.

In the case of the configurations of FIGS. 1B and 1C, the position of the unmanned surface vehicle can be calculated by the GPS and an inertia measurement apparatus. If the wire between the unmanned surface vehicle and the environmental measuring system is straight, the relative position of the environmental measuring system can be calculated by the length and direction of the wire. Therefore the configurations of FIGS. 1B and 1C are available for the inspection of underwater structure without stream. (see FIG. 2). If the wire is curved and the reconfigurable robot does not have any acoustic system such as the transponder, it is difficult to identify the position of the environmental measuring system. Thus, the operator cannot know where the data is obtained by the environmental measuring system in this case.

In the case of the configuration of FIG. 1A, the position of the unmanned surface vehicle can be calculated by the GPS and an inertia measurement apparatus. Then, the position of the environmental measuring system mounted on the unmanned surface vehicle also can be calculated by the relative position between the two. However, the unmanned surface vehicle needs to drive a thruster in running water. Consequently the power of the battery for the thruster is rapidly consumed. In addition, the unmanned surface vehicle cannot be easily retrieved when it drifts away or sinks due to the mechanical or electrical troubles of the system.

In the case of the configuration of FIG. 1D, the unmanned surface vehicle is moored by a wire from the land side. Thus, it reduces the possibility of losing the robot. In this case, the unmanned surface vehicle can approach the front of the pier of the bridge and measure the shape of the riverbed around the pier with the sonar mounted at the robot bottom as shown in FIG. 3. Since a part of the fluid drag force applied to the unmanned surface vehicle is supported by the wire tension, the consumption of the battery power used for the thruster can be slightly reduced. However, it is necessary to drive the thruster to keep the desired position, thus still leaving a disadvantage of the consumption of the battery power to drive the thruster. Furthermore, since the sonar detects rotation sound of the thruster or air bubbles generated by cavitation when driving the thruster, it gets noise of the measurement data of the sonar. On the other hand, Japanese Patent Laid-Open No. 2015-000596 proposes a vessel which has a turnable propeller called as an air rudder at the bow side to move forward/backward and turn without generating air bubbles in the water. However, this vessel needs to keep driving the propeller to cruise a river even when the vessel stops without drifting. It is a disadvantage to this vessel because it induces a rapid consumption of power.

An object of the present invention is to provide the position control system and the position control method for an unmanned surface vehicle which investigates underwater environments dissolving disadvantages mentioned above.

SUMMARY OF THE INVENTION

The distinctive feature of the present invention is to adopt a position control by using new combination of devices: a rudder system mounted on an unmanned surface vehicle, a mooring device fixed on the ground, and a wire between the mooring device and the unmanned surface vehicle to solve the above disadvantages, while the conventional position control uses the conventional devices such as a thruster or an air rudder.

Specifically, the present invention is characterized in that a position control system for an unmanned surface vehicle includes: at least one mooring device fixed on the ground; a wire fed and wound from the mooring device; an unmanned surface vehicle connected at the tip end of the wire; and at least one rudder equipped on the unmanned surface vehicle, wherein the mooring device includes a mooring device control means for controlling the feeding and winding of the wire, the unmanned surface vehicle includes a GPS and an inertia measurement apparatus for sensing the position and posture of the unmanned surface vehicle, an angle sensing means for the rudder, and a rudder control means for drive-controlling the rudder, the mooring device control means and the rudder control means include communication systems for sending and receiving the information of the each control apparatus, and the mooring device control means and the rudder control means control the position of the unmanned surface vehicle to reach the target.

In the position control system, the total number of the mooring devices and the rudders is three or more.

The position control system further includes at least one of the following three mechanisms: a wire connection point (WCP) shifting mechanism of that can shift a wire connection point between the wire and the unmanned surface vehicle, a center of gravity (COG) shifting mechanism that can shift the center of gravity of the unmanned surface vehicle, and a rudder shifting mechanism that can shift a position of the rudder.

According to the present invention, the position control of the unmanned surface vehicle is executed not by the conventional method of driving a thruster or an air propeller but by a method of driving the rudder equipped on the unmanned surface vehicle and the mooring device fixed on the ground to feed and wind a wire between the mooring device and the unmanned surface vehicle. Since the unmanned surface vehicle does not use the thruster, the measurement data of the sonar attached to the bottom of the unmanned surface vehicle is prevented from negative effects of air bubbles or noise generated by a thrust apparatus (thruster). Furthermore, the unmanned surface vehicle has a mechanism that can mechanically hold the rudder angle and the wire length. This consequently suppresses the power consumption comparing to a drive of the thrust apparatus. Still more, the unmanned surface vehicle connected via a wire to the mooring device fixed on the ground can avoid being lost when the unmanned surface vehicle drifts away or sinks due to the mechanical or electrical troubles of the system.

Further features of the present invention will become apparent from the following description of exemplary embodiments with reference to the attached drawings.

BRIEF DESCRIPTION OF THE DRAWINGS

FIG. 4 illustrates the movement of an unmanned surface vehicle in a basic model (one mooring device and two rudders) of the unmanned surface vehicle position control system of the present invention using a wire mooring device (mooring system) and a rudder;

FIGS. 5A and 5B illustrate a control example 1 for the desired motion of the unmanned surface vehicle of FIG. 4;

DESCRIPTION OF THE EMBODIMENTS

Figures 1A, 1B, 1C, 1D:
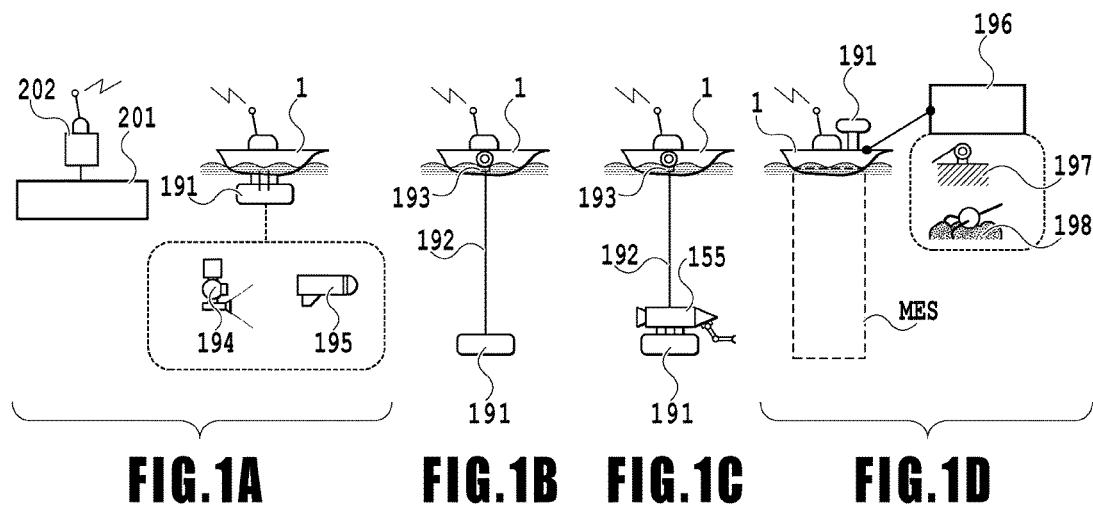
FIGS. 1A to 1D illustrate the basic configuration of the conventional reconfigurable robot for underwater investigation.
Figure 2:
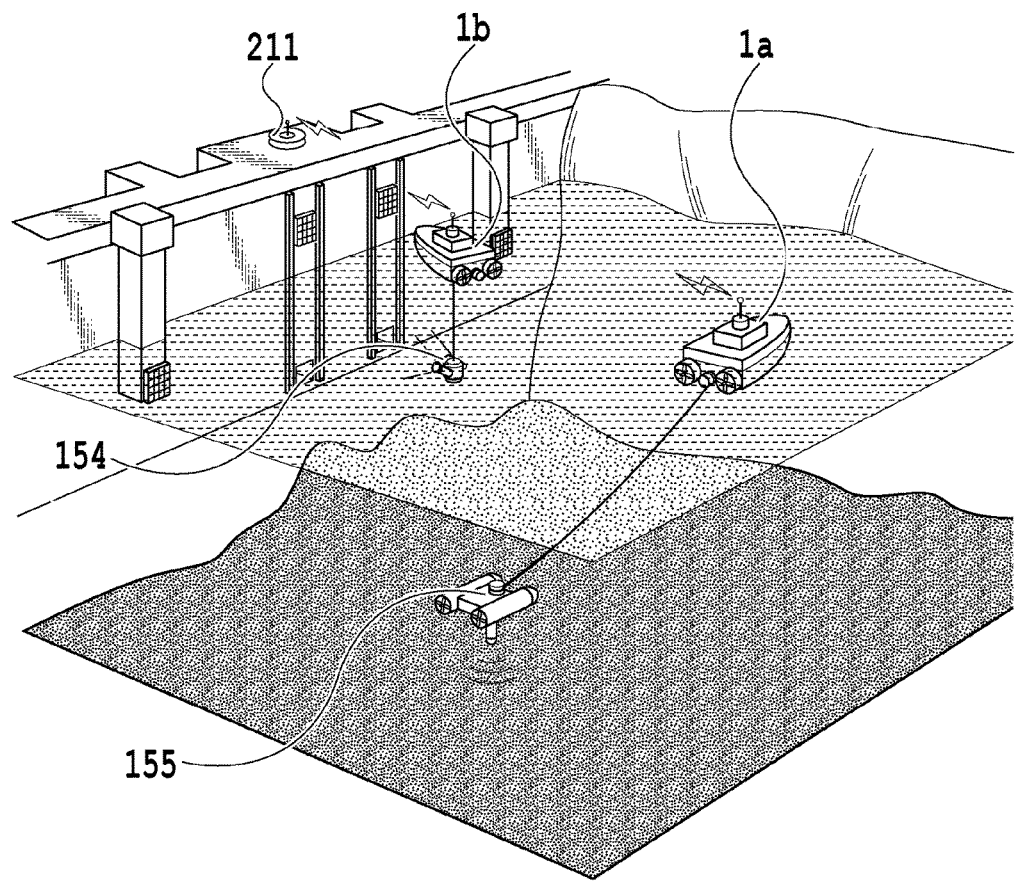
FIG. 2 illustrates a configuration example assuming an actual operation of the conventional reconfigurable robot for underwater investigation.
Figure 3:
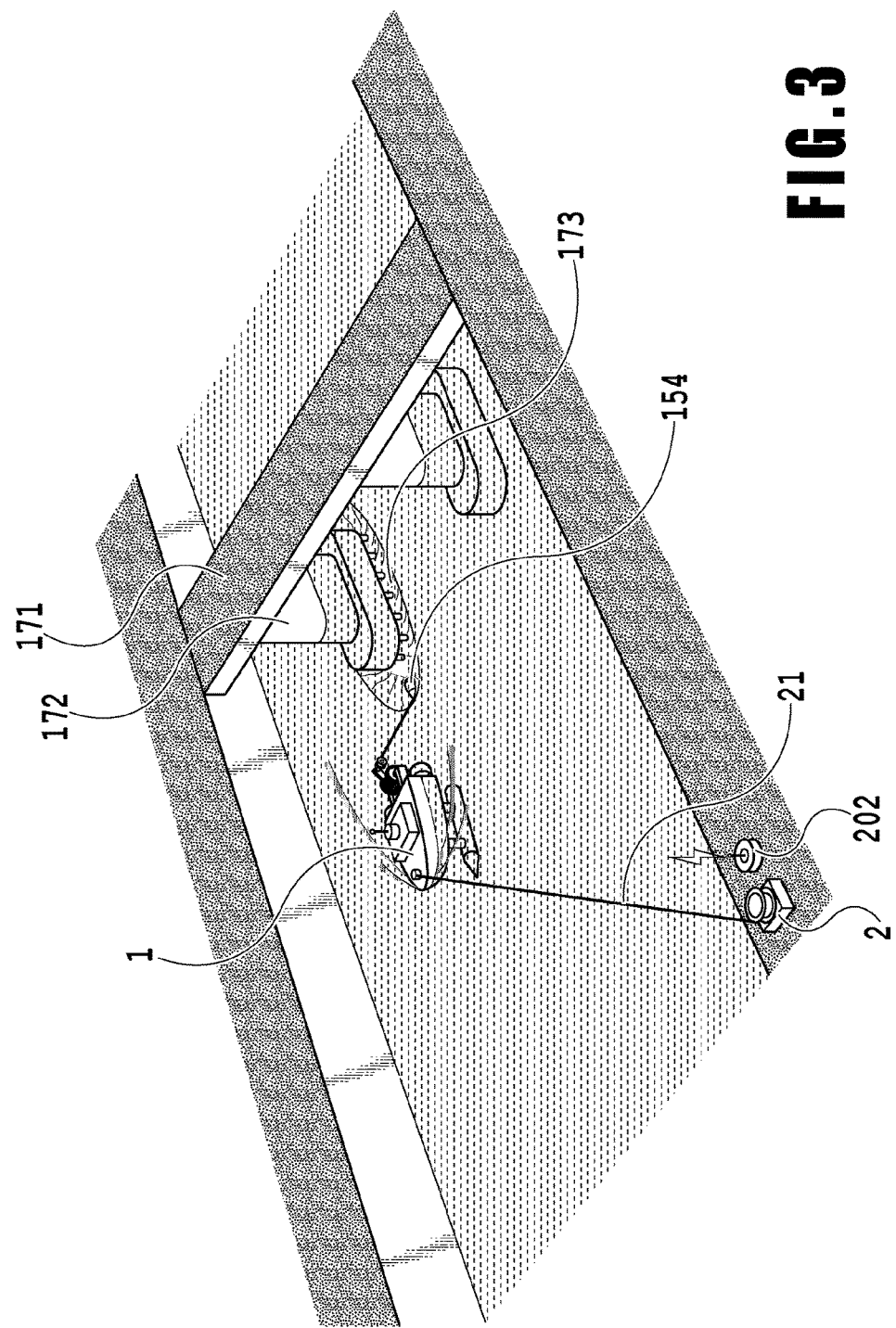
FIG. 3 illustrates a configuration example of the conventional reconfigurable robot that actually investigates underwater environments.
Figure 6:
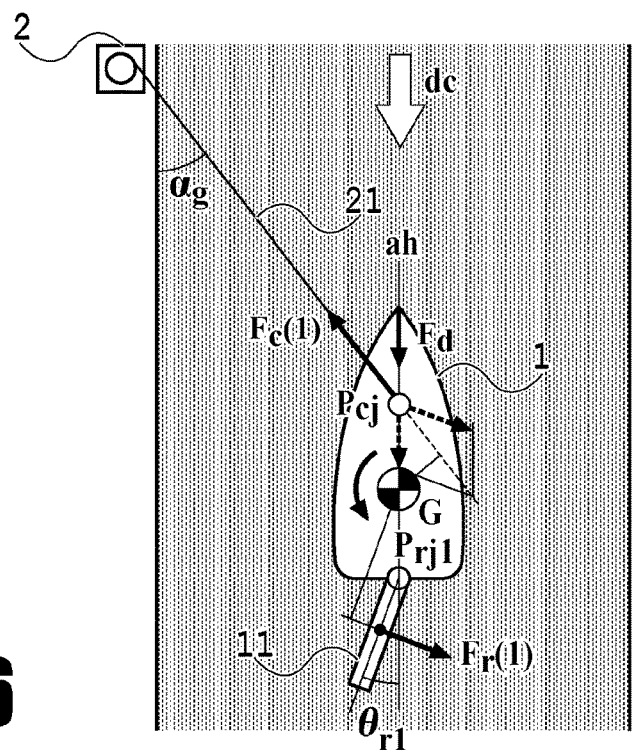
FIG. 6 illustrates an example for a basic model of the present invention using one mooring device and one rudder.

Generally, an unmanned surface vehicle in flowing water receives forces such as a gravitational force, a buoyant force, a drag force, or a lift force. Here, it is assumed that the vertical movement of the unmanned surface vehicle is ignored and that the horizontal movement is mainly subjected to a drag force and a lift force. The resultant force of a drag and a lift force is called as a fluid force. It is conserved the fluid force and tension of the wire as a horizontal external force acting on the unmanned surface vehicle. Furthermore, it is assumed that the unmanned surface vehicle is moored by "i" wires and the unmanned surface vehicle includes "k" rudders. FIG. 4 represents the case where i=1 and k=2. As shown in FIG. 4, Fd denotes the fluid force vector applied to the draft of the unmanned surface vehicle 1, Fc(h) denotes the horizontal component of the tension vector applied to the h wire (where h=1, 2, . . . , i) 21, Fr(j) denotes the horizontal component of the fluid force vector applied to the j rudder (where j=1, 2, . . . , k) 11, 12, mb denotes the mass of the unmanned surface vehicle 1, Ib denotes the moment of the inertia of the unmanned surface vehicle 1, $p_b, \varphi_b,$ denote the position vector from the center of gravity G of the unmanned surface vehicle 1 and the posture vector between the center line of the unmanned surface vehicle 1 ah and a water flow direction dc, respectively, $p_d, p_c(h), p_r(j)$ denote the position vector from the center of gravity G of the unmanned surface vehicle 1 to each application point of the fluid force applied to the draft of the unmanned surface vehicle 1, the wire h, and the rudder, respectively. Note that symbols 21, 11, and 12 shown in FIG. 4 to FIG. 20 denote just the "name" of wire and rudders. Therefore 21, 11, and 12 in FIG. 1 represent the first wire (h=1), the first rudder (j=1), and the second rudder (j=2), respectively.

In this case, the force vector Fb acting on the gravity center G of the unmanned surface vehicle 1 and the moment vector Mb are represented by the following equations.

$$F_b = F_d + \sum_{h=1}^{i} F_c(h) + \sum_{j=1}^{k} F_r(j)$$

$$M_b = p_d \times F_d + \sum_{h=1}^{i} (p_c(h) \times F_c(h)) + \sum_{j=1}^{k} (p_r(j) \times F_r(j))$$

Thus, the unmanned surface vehicle 1 has a dynamic equation established as shown below.

$$m_b \frac{d^2 p_b}{dt^2} = F_b$$

$$I_b \frac{d^2 \varphi_b}{dt^2} = M_b$$

The fluid force vectors Fd and Fr(j) are divided into the drag vectors fDd and fDr(j) and the lift force vectors fLd and fLr(j) and can be represented by the following equations.

$F_d = f_{Dd} + f_{Ld}$ $F_r(j) = f_{Dr}(j) + f_{Lr}(j)$

In the following description, when a variable Xn is used, the index n represents d or r. When n is d, the variable represents the draft of the unmanned surface vehicle and, when n is r, the variable represents the rudder. It is assumed that the fluid density is ρ, the relative velocity vector of the object (the draft or rudder) to the fluid is vn, the object (the draft or rudder) to a plane vertical to the fluid flow has a projection area SDn, the object (the draft or rudder) to a plane parallel to the fluid flow has a projection area SLn, the drag coefficient is CDn, the lifting power coefficient is CLn, and a unit vector vertical to the relative velocity vector vn within the horizontal plane is epn. In this case, the drag vector fDn and the lifting power vector fLn acting on the draft and the rudder of the unmanned surface vehicle are determined by the following equations.

$f_{Dd} = \frac{1}{2} \rho |v_d| v_d S_{Dd} C_{Dd}$ $f_{Ld} = \frac{1}{2} \rho |v_d|^2 e_{pd} S_{Ld} C_{Ld}$ $f_{Dr}(j) = \frac{1}{2} \rho |v_r(j)| v_r(j) S_{Dr}(J) C_{Dr}(j)$ $f_{Lr}(j) = \frac{1}{2} \rho |v_r(j)|^2 e_{pr} S_{Lr}(J) C_{Lr}(j)$ Thus, the mechanism constants mb and Ib and the density p can be known and the values of the coefficients CDn and CLn can be obtained by an experiment. Then, the relative velocity vector vn and the projection areas SDn and SLn and the position vector $p_d, p_c(h), p_r(j)$ can be calculated. Furthermore, the tension vectors Fc(h) of all wires can be measured by a sensor. Alternatively, it is assumed that all wires are modeled by a spring or a damper for example and the wire tension vector Fc(h) can be calculated based on the elongation. In this case, the resultant force Fb applied to the gravity center of the unmanned surface vehicle and the total moment Mb can be calculated. Thus, based on the dynamic equation, the positions and the postures of the unmanned surface vehicle at the respective timings can be calculated. As described above, the general behavior of the moored unmanned surface vehicle can be expressed by the dynamic equations with the four equations for the fluid force.

Control Example 1 of a Target Movement in the Case where the Configuration is Composed of One Mooring Device and One Rudder FIGS. 5A and 5B illustrate the control example 1 for the desired motion of the unmanned surface vehicle from the start point to the goal point. As shown in FIG. 5A, the position of the wire feeding point of the mooring device 2 is higher than that of the unmanned surface vehicle. This condition may fit for actual environment, however it is assumed that the vertical gap of the two position is smaller than the wire length because this assumption also fit for actual investigation task. Therefore, the vertical movement of the unmanned surface vehicle caused by tension of the wire is ignored. In the case where the length of the wire is constant, the unmanned surface vehicle follows the circular path only by suitable control of rudders as shown in FIG. 5B. Assuming that ag and ac in FIG. 5B denote the current wire angle and the target wire angle, respectively, the control value for the rudder angle is given by multiplying the angular error (αg-αc) by the gain. Then, the command rudder angle θg is given by adding this control value for the rudder angle to the current rudder angle. The rudder is controlled to follow the command angle θg at each sampling time.

Disadvantage Regarding the Target Movement Control in the Case where the Configuration is Composed of One Mooring Device and One Rudder To keep the vessel body stationary at the target point in running water in the case that the wire length is constant, it is necessary to control the wire angle to be the target angle. The wire angle can be controlled by one rudder as shown in the control example 1, however the wire angle and the posture of the vessel cannot be controlled at the same time because the number of the control input is just one. To control the two parameters, another control input is required.

Figure 7:
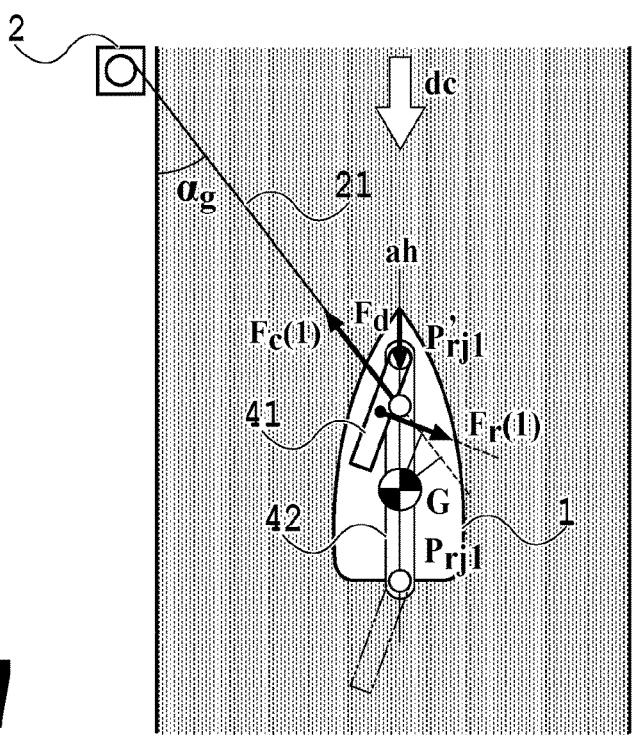
FIG. 7 illustrates a control system in the basic model of the present invention (one mooring device, one rudder, and the rudder shifting mechanism)

Control Example 2 of the Target Movement in the Case where the Configuration is Composed of One Mooring Device 1 and One Rudder and a Rudder Shifting Mechanism Following the method shown in the control example 1, the wire angle reaches to the target angle by control of the rudder angle 11. At that time, the resultant force and moment vector Fb and Mb can be zero (Fb=0 and Mb=0) when controlling the rudder angle 41 suitably and the position of the rudder from Prj1 shown in FIG. 7 to the appropriate position P'rj1 by using the rudder shifting mechanism 42. In the case where Fb=0 and Mb=0, it is relatively easy to make the wire angle reach the target angle αg, the vessel body axis ah get parallel to the water flow direction dc and the vessel body keep at the same position as shown in FIG. 7.

Figure 8:
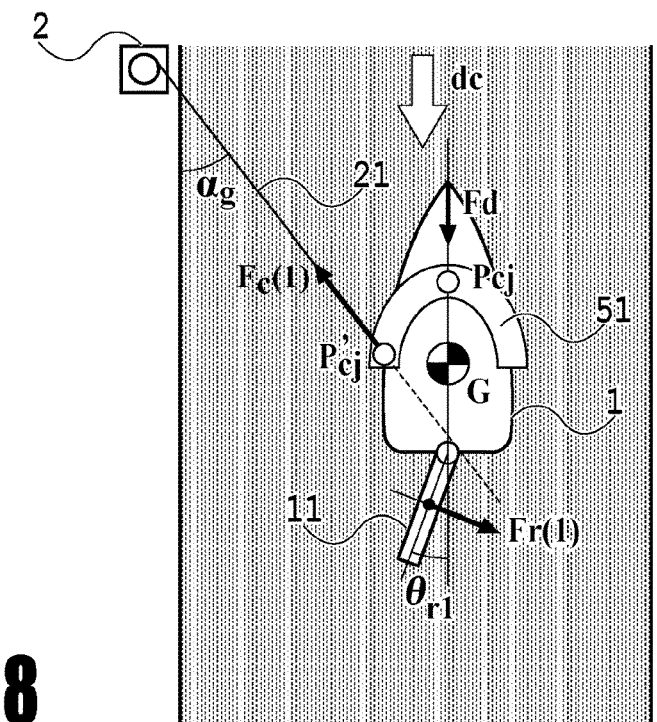
FIG. 8 illustrates the control system in the basic model of the present invention (one mooring device, one rudder, and the wire connection point shifting mechanism)

Control Example 3 of the Target Movement in the Case where the Configuration is Composed of One Mooring Device, One Rudder, and a Wire Connection Point Shifting Mechanism Following the method shown in the control example 1, the wire angle reaches to the target angle by control of an angle of the rudder 11. At that time, the resultant force and moment vector Fb and Mb can be zero (Fb=0 and Mb=0) when controlling the rudder angle suitably and the position of the wire connection point (WCP) from Pcj shown in FIG. 8 to the appropriate position P'cj by using the WCP shifting mechanism 51. In the case where Fb=0 and Mb=0, it is relatively easy to make the wire angle reach the target angle αg, the vessel body axis ah get parallel to the water flow direction dc and the vessel body keep at the same position as shown in FIG. 8.

Figure 9:
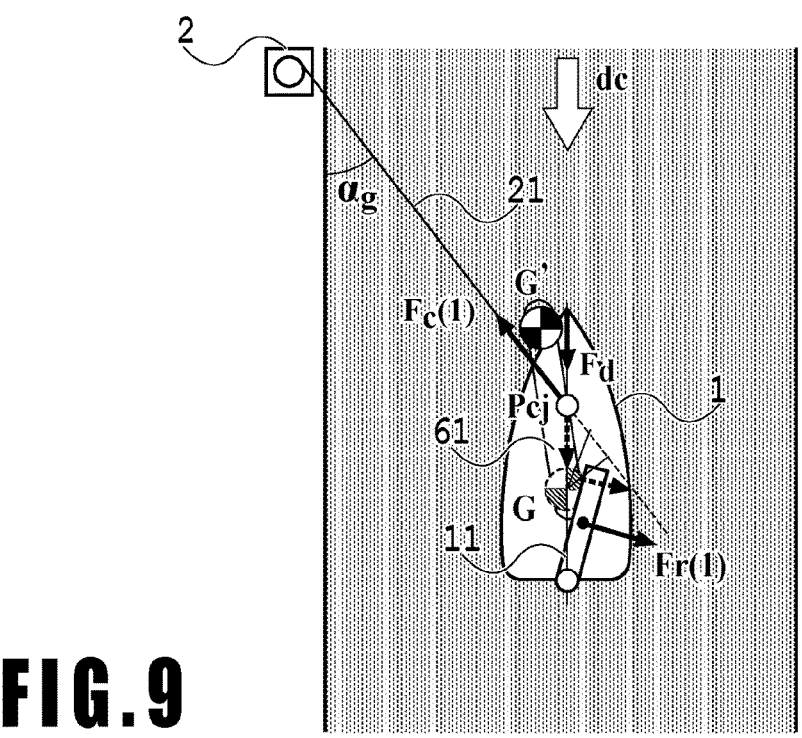
FIG. 9 illustrates the control system in the basic model of the present invention (one mooring device, one rudder, and the gravity center shifting mechanism)

Control Example 4 of the Target Movement in the Case where the Configuration is Composed of One Mooring Device, One Rudder, and a Gravity Center Shifting Mechanism Following the method shown in the control example 1, the wire angle reaches to the target angle by control of an angle of the rudder 11. At that time, the resultant force and moment vector Fb and Mb can be zero (Fb=0 and Mb=0) when controlling the rudder angle suitably and the position of the vessel body gravity center G shown in FIG. 9 to the vessel body gravity center G' by using the gravity center shifting mechanism 61. In the case where Fb=0 and Mb=0, it is relatively easy to make the wire angle reach the target angle αg, the vessel body axis ah get parallel to the water flow direction dc and the vessel body keep at the same position as shown in FIG. 9.

Figure 10:
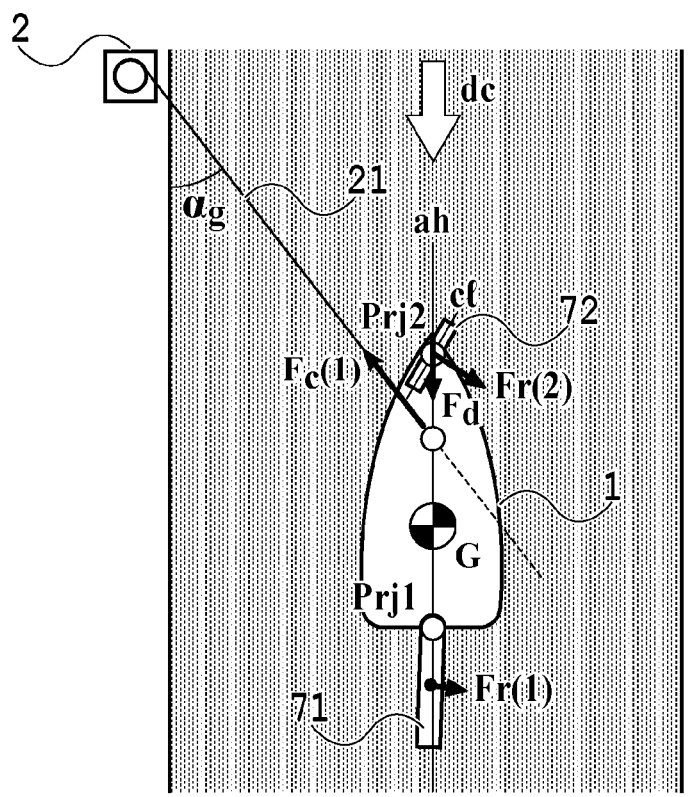
FIG. 10 illustrates an example in which the control system of the basic model of the present invention (one mooring device, two rudders) using rudders provided at the stern side and the bow side.

Control Example 5 of the Target Movement in the Case where the Configuration is Composed of One Mooring Device and Two Rudders Setting an angle of the rudder 72 in FIG. 10 as its center line cl fits for the center line of the vessel body ah and following the method shown in the control example 1, the wire angle reaches to the target angle by control of the rudder angle 11. At that time, the resultant force and moment vector Fb and Mb can be zero (Fb=0 and Mb=0) when controlling the rudder angle 11 and 72 shown in FIG. 10 suitably. In the case where Fb=0 and Mb=0, it is relatively easy to make the wire angle reach the target angle αg, the vessel body axis ah get parallel to the water flow direction dc and the vessel body keep at the same position as shown in FIG. 10. The rudder installation position is not needed to be mounted on the vessel body axis ah and also can be set as shown in FIG. 4 and FIG. 11 so long as $$\varphi_b=0,$$

Fb=0 and Mb=0 can be achieved by the rudder control.

Figure 11:
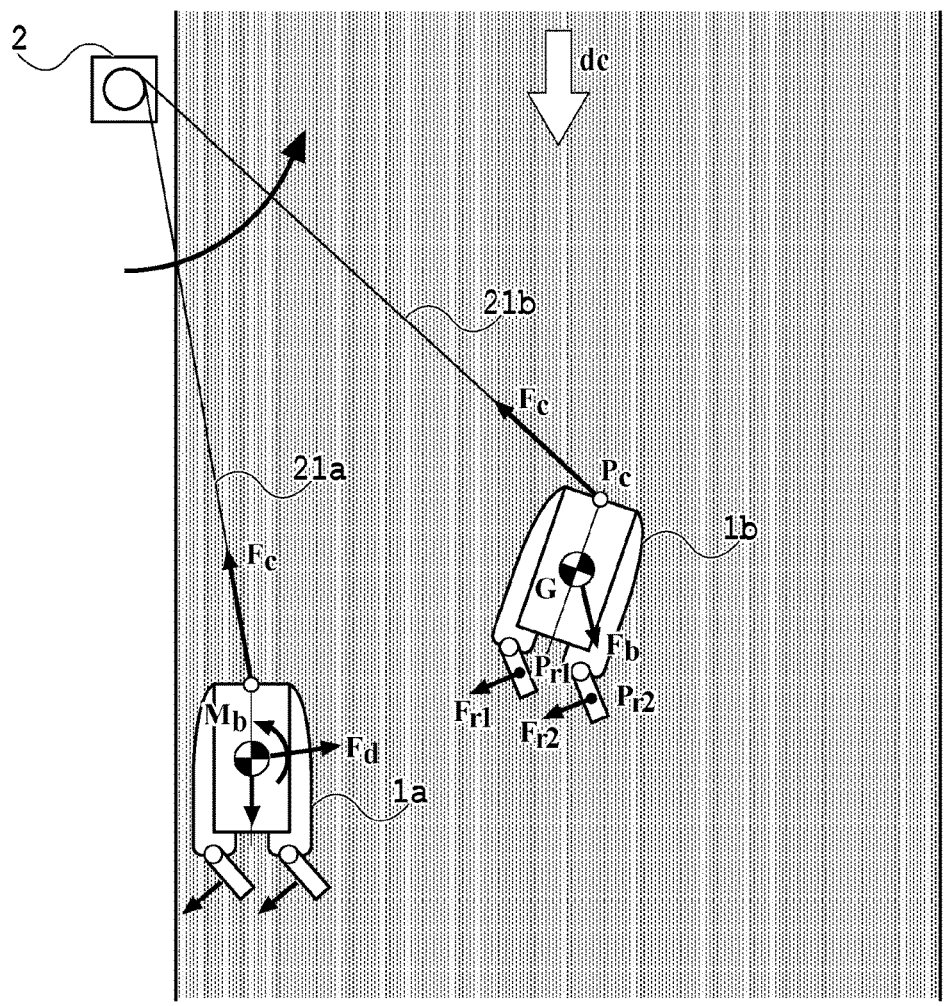
FIG. 11 illustrates an example in which the basic model of the present invention (one mooring device, two rudders) is used to move the model on a circular arc around the mooring device as a supporting point.

When controlling the two rudders of the unmanned surface vehicle at the position of the unmanned surface vehicle 1a in FIG. 11 to rotate counterclockwise with the wire length constant, the vessel may turn right due to the water flow. At that time, the fluid force applies to the left side of the vessel body stronger than that applies to the right side and the vessel starts to be moved to right by the lift force in the right direction perpendicular to the water flow direction dc. Consequently, the vessel moves from the position of the unmanned surface vehicle 1a to the position of the unmanned surface vehicle 1b with turning around supporting point of the wire, the mooring device 2, because the movement of the wire connection point Pc is restricted in the extending direction of the wire. As shown in FIG. 11, both angles of twin rudders are controlled to be same, however the posture of the vessel body as well as the wire angle may be controlled by controlling angles of twin rudders independently.

Figure 12:
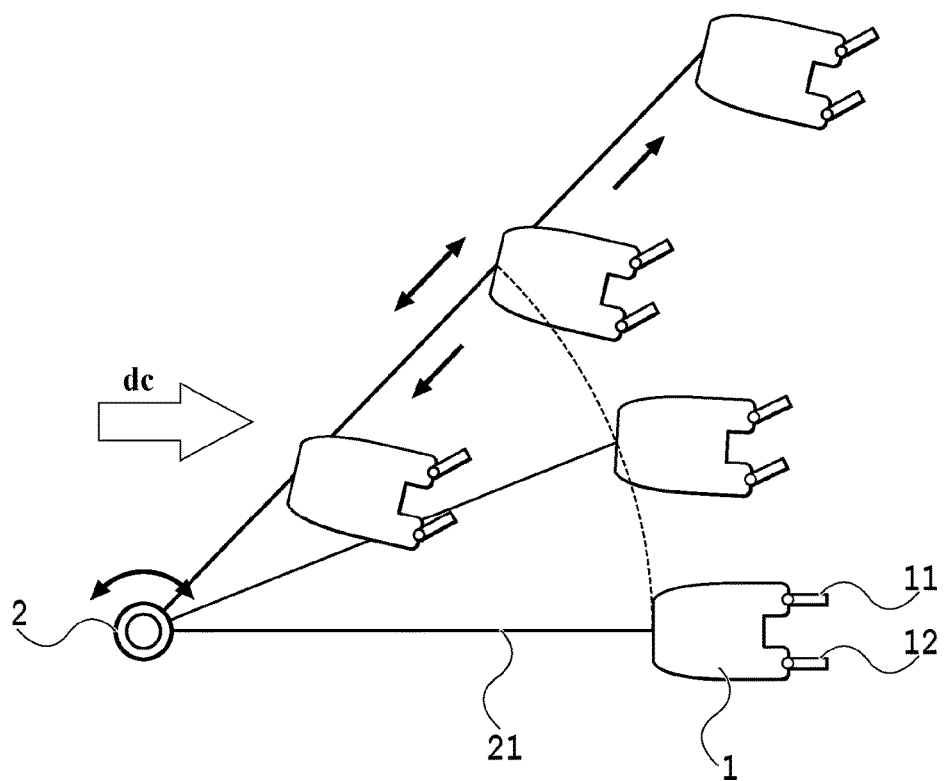
FIG. 12 illustrates the control example of the target movement having a variable wire length in the basic model of the present invention (one mooring device, two rudders)

Control Example 6 of the Target Movement in the Case where the Configuration is Composed of One Mooring Device and Two Rudders FIG. 12 illustrates the control example 6 of the desired motion of the unmanned surface vehicle in the case where the system is composed of one mooring device and two rudders and the wire length is controlled. In this control example 6, the rudder angle is firstly controlled as shown in the control example 1 while the wire length is constant. When the rudder angle reaches the target angle, then the wire length is controlled to follow the command wire length at each sampling time. The command wire length is obtained by adding the current wire length to the control value that is given by multiplying the error between the target wire length and the current wire length by the gain. The wire is droved by the mooring device. In this way, the unmanned surface vehicle can be controlled to move in the direction perpendicular to the wire as well as in the direction parallel to the wire. Note that the wire angle α can be controlled not only by rudders but also by the control method shown in the control examples 1 to 4. Controlling both angle and length of the wire, the unmanned surface vehicle can move everywhere in the downstream side of the mooring device 2 shown in FIG. 19, theoretically.

As shown in the control examples 2 to 5, the position of the unmanned surface vehicle 1 can be defined by including: at least one mooring devices 2 provided at the land side; a wire fed and wound from the mooring device 2; an unmanned surface vehicle 1 connected to a tip end of the wire; and at least one rudders 11, 12 provided in the unmanned surface vehicle 1. The total number of the mooring devices and the rudders is three or more. Alternatively, the unmanned surface vehicle includes the one mooring device, the one rudder, and a rudder shifting mechanism. Alternatively, the unmanned surface vehicle includes the one mooring device, the one rudder, and a WCP shifting mechanism. Alternatively, the unmanned surface vehicle includes the one mooring device, the one rudder, and a gravity center shifting mechanism.

Basic Configuration of the Control System

Figure 13:
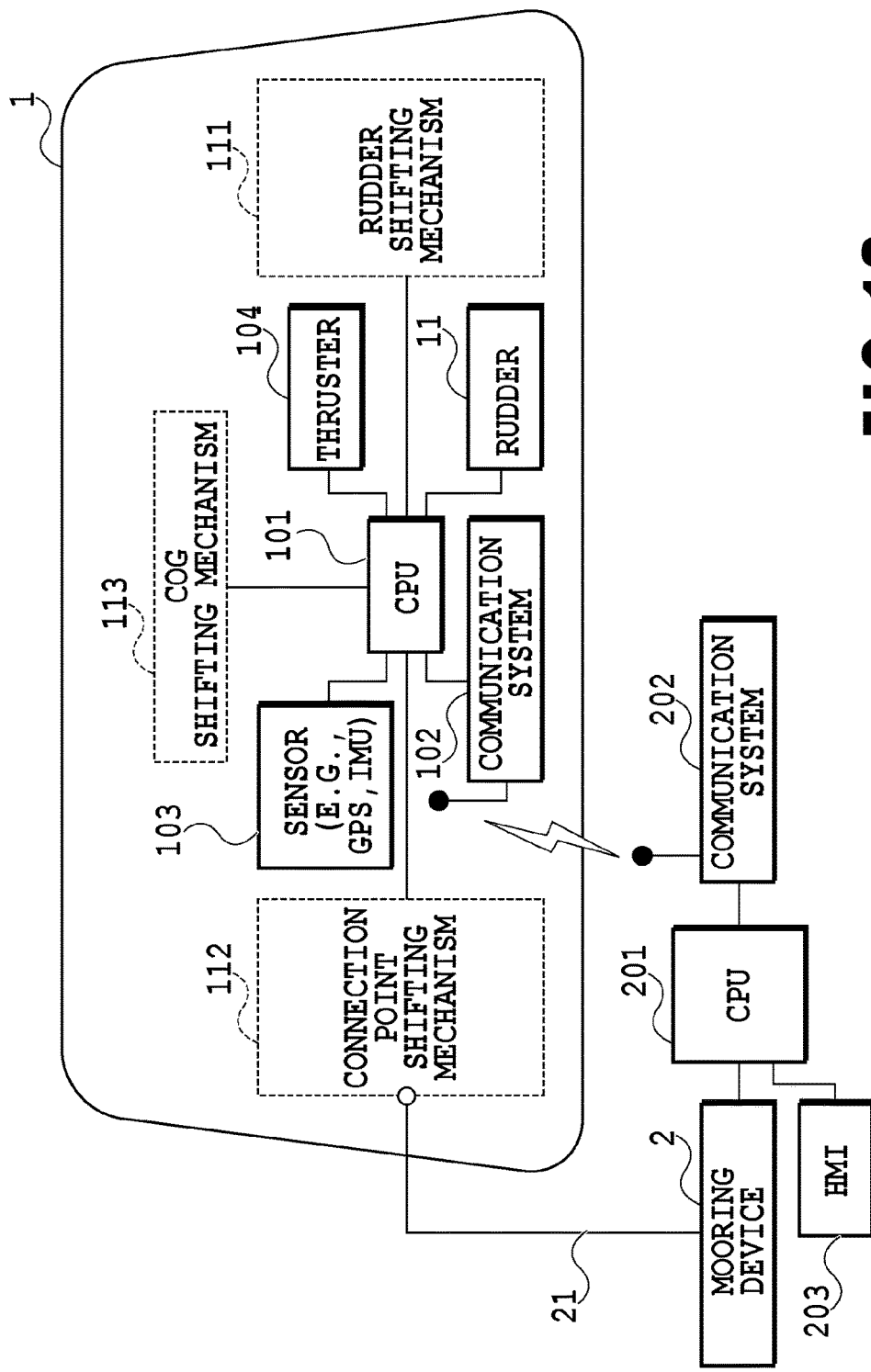
FIG. 13 illustrates a basic configuration of the position control system of the present invention.

FIG. 13 illustrates a basic configuration of the position control system of the present invention. The basic configuration of this position control system includes a mooring device 2 at the land side and a mooring device 2 including a mooring device control means (CPU) 201 for controlling the feeding and winding of the wire 21, a means for detecting the position and posture of the unmanned surface vehicle 1, and a communication system 202 for the transmission and reception with the vessel body side of the unmanned surface vehicle 1. The vessel body side of the unmanned surface vehicle 1 moored by a wire includes: a rudder 11; a rudder control means (CPU) 101 for drive-controlling the rudder 11; a rudder angle sensing means; and a communication system 102 for the transmission and reception with the land-side mooring device 2. By sending and receiving information via both of the communication systems, the mooring device control means can cooperate with the rudder control means to control the movement of the unmanned surface vehicle to the target position. The mooring device control means 201 has an input means (HMI) 203 to input a target position for example.

When the system includes only one mooring device and one rudder and the position and posture of the unmanned surface vehicle are controlled, the unmanned surface vehicle must include, in addition to the mooring device and the rudder, at least one of a rudder shifting mechanism 111 that can move the rudder installation position, a WCP shifting mechanism 112 that can move a point at which the wire is connected to the unmanned surface vehicle, and a center of gravity (COG) shifting mechanism 113 that can move the gravity center of the unmanned surface vehicle. The control of the rudder shifting mechanism 111, the WCP shifting mechanism 112, and the COG shifting mechanism 113 requires a sensor 103 for sensing the travel distance of the object moving on the respective mechanisms and a drive control means (CPU).

The GPS inertia measurement apparatus provided in the unmanned surface vehicle can be used to sense the position and posture of the unmanned surface vehicle. However, these apparatuses are insufficient to sense a loose wire. To handle this, the tension is prevented from being zero by providing an apparatus to measure the wire feed amount or a wire tension sensor that can sense a loose wire. Furthermore, the mooring device fixed on the land side allows the moored position to be easily identified. Thus, the position and posture of the unmanned surface vehicle can be calculated without the GPS inertia measurement apparatus by allowing the mooring device to include the wire length sensing means and the wire angle sensing means and by allowing the unmanned surface vehicle to include the wire angle sensing means, respectively. However, a loose wire prevents the position and posture of the unmanned surface vehicle from being correctly calculated. Therefore, when the GPS inertia measurement apparatus is not used, then the tension must be prevented from being reached by providing, for example, a wire tension sensor that can sense a loose wire or a clutch that can prevent a certain tension or less from being reached.

Alternatively, the addition of a thruster 104 can provide the position control using the rudder even when there is no flow.

Example of the Generation of a Terrain Map Using Sonar

Figure 14:
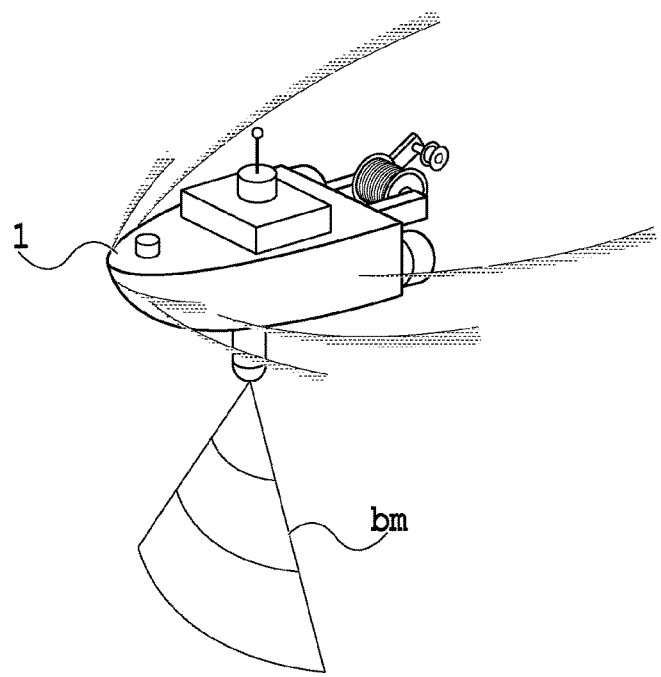
FIG. 14 illustrates a direction along which a sonar beam is emitted. The sonar beam is generally emitted in a direction vertical to the travelling direction of the vessel body and at an angle even in both left and right directions.

In order to measure the shape of a river bed or a bed protection by sonar to generate a terrain map, the unmanned surface vehicle 1 must be moved thoroughly within a target region so as to eliminate any measurement failure. Generally, the direction along which a sonar beam bm is emitted is a direction vertical to the direction along which the vessel body travels as shown in FIG. 14 and the beam is emitted at an angle even in both left and right directions.

Figure 15:
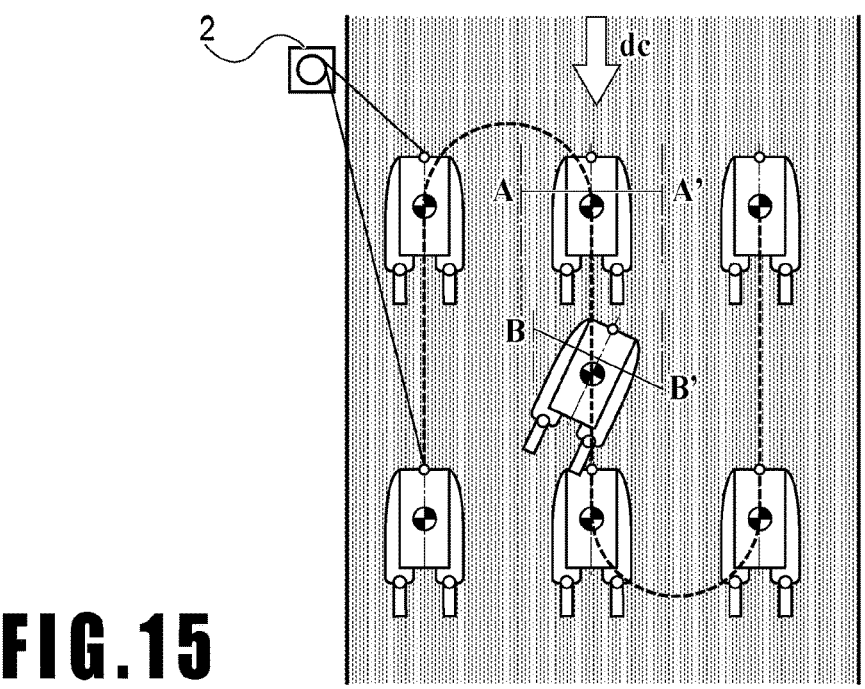
FIG. 15 illustrates a vessel handling example in a case where the basic model of the present invention (one mooring device, two rudders) is used to generate a terrain map using sonar.

In order to move the unmanned surface vehicle along the wavelike trajectory of the dash line of FIG. 15, when assuming that the riverbed is horizontal, a measurement region covered by one sonar beam emission is as shown by AA' in FIG. 15. When the vessel body has a posture in the same direction as the water flow direction dc as shown in the drawing, the movement of the vessel body causes the measurement region to have a stripe-like shape having the width AA'. However, if the vessel body has an inclined posture, the measurement region is covered by BB' in FIG. 15, which may cause the width of BB' in a direction vertical to the flow to be smaller than the width of AA'. In this case, a measurement failure may be caused. If the posture of the vessel body is shaky, then a variation is caused in the measurement density distribution. Furthermore, if the vessel body posture is inclined relative to the flow velocity direction, then the vessel body receives an increased fluid drag. In order to avoid these disadvantages, the vessel body posture is desirably in the same direction as the flow velocity direction to the maximum.

System Example Composed of Two Mooring Devices and One Rudder

Figure 16:
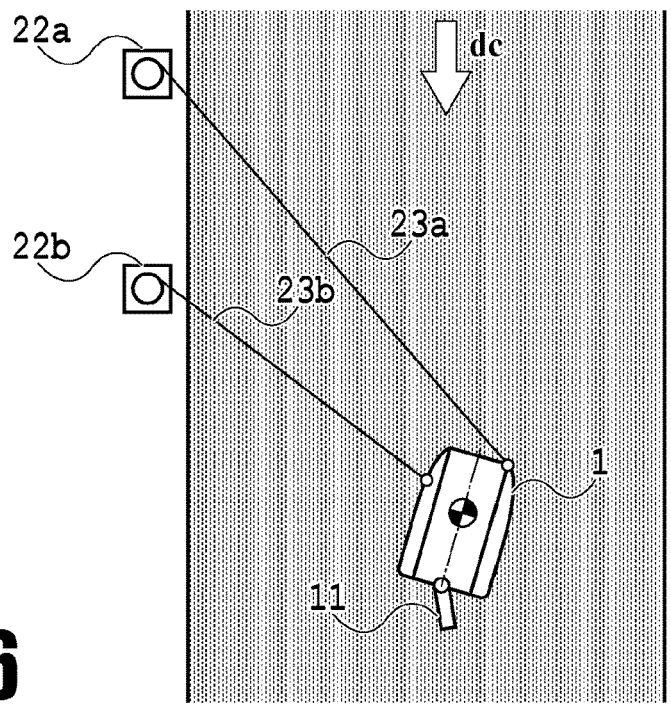
FIG. 16 illustrates the basic model of the present invention (two mooring devices, one rudder)

FIG. 16 illustrates a system example of the present invention composed of two mooring devices 22a, 22b and one rudder 11. In the drawing, the two mooring devices 22a, 22b are provided at the right waterfront side of the water flow. Two mooring devices 22a, 22b are connected to the unmanned surface vehicle 1 via wires 23a, 23b. However, one mooring device can be provided at the left waterfront side and one mooring device can be provided at the right waterfront side.

Figure 17:
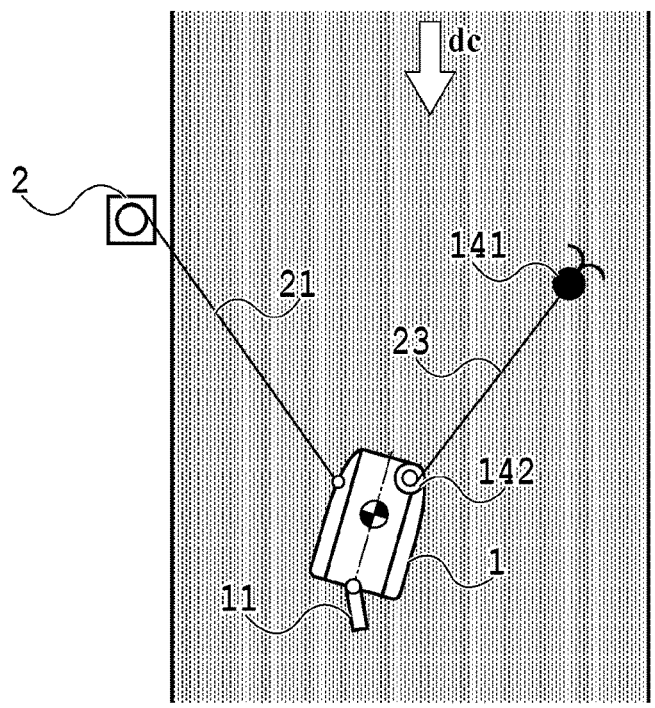
FIG. 17 illustrates a configuration example of the present invention in which one wire is fixed by an anchor to the river bottom in FIG. 16 and the feeding and winding of this wire is controlled by the unmanned surface vehicle side.

A Modification Example of a System Composed of Two Mooring Devices and One Rudder FIG. 17 illustrates a system as a modification example of the system of FIG. 16 in which one wire 21 is connected to the mooring device 2 and the other wire 23 is connected to an anchor 141 fixed to the river bottom and a side winch 142 of the unmanned surface vehicle is used to feed and wind the wire 23.

A System Example Composed of a Catamaran Unmanned Surface Vehicle, One Mooring Device, and Two Rudders 2

Figure 18:
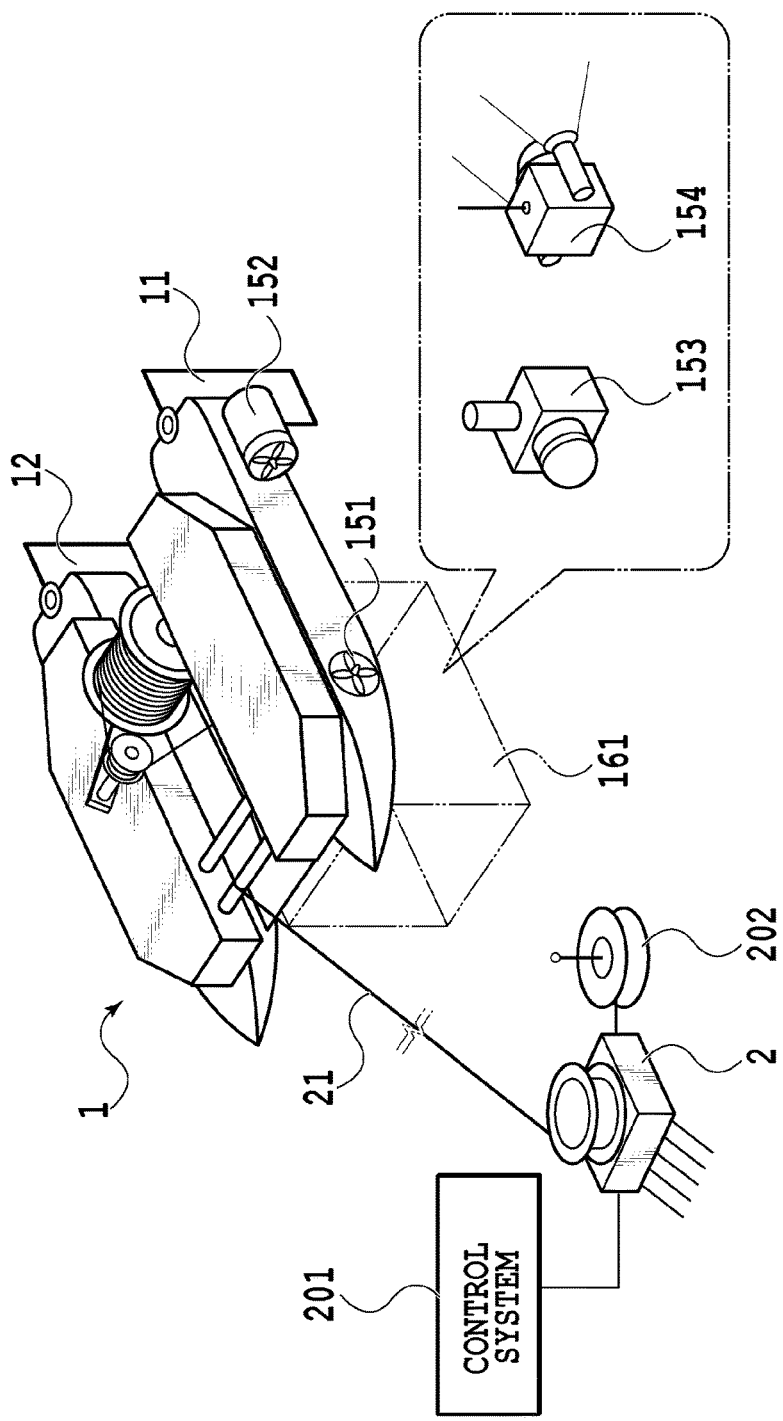
FIG. 18 illustrates a configuration example in which the basic model of the present invention (one mooring device, two rudders) further includes a thruster for modularization. The bottom can include sonar or an underwater observational instrument.

FIG. 18 illustrates the case where a thruster 152 is further added to a catamaran unmanned surface vehicle 1 as a basic model of the present invention (combination of one mooring device and two rudder). The bottom space 161 represents an installing place of an acoustic imaging sonar 153 or an underwater observational instrument 154. The addition of the thruster enables the control system 201 to control the position of the unmanned surface vehicle 1 even when the water flow is quite slow. Moreover, the unmanned surface vehicle 1 can return to the home position near the waterfront thanks to the thruster after finishing the measurement task.

Figure 19:
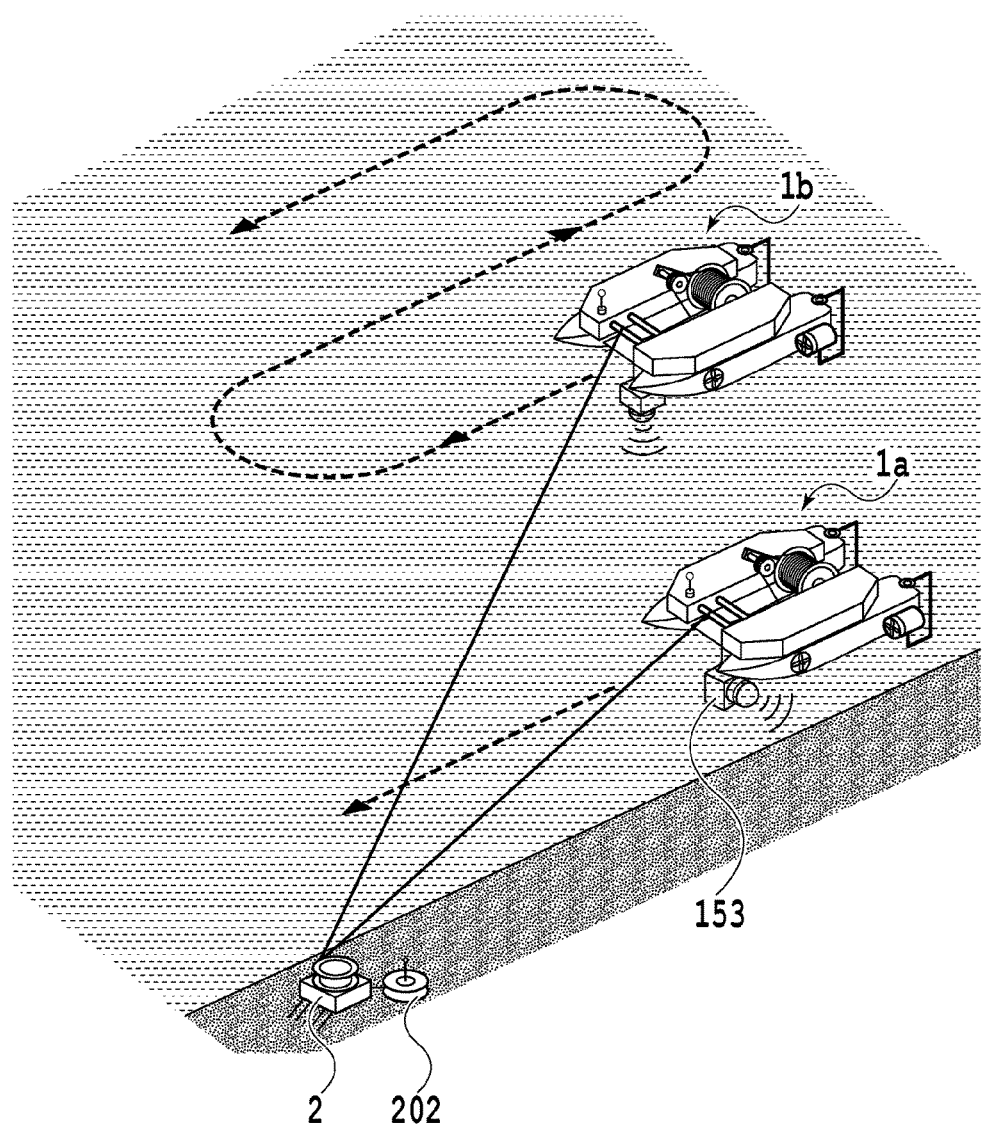
FIG. 19 illustrates an example in which the apparatus of FIG. 18 is used to perform a straight movement and a wavelike movement.

FIG. 19 illustrates example tasks of inspection of a revetment and a riverbed by using the above system with pan-tilt sonar shown in FIG. 18. The unmanned surface vehicle 1a in FIG. 19 moves linearly along the revetment with the sonar head faced leftward to inspect the revetment. The unmanned surface vehicle 1b in FIG. 19 meanders with the sonar head faced to downward to inspect the riverbed.

Figure 20:
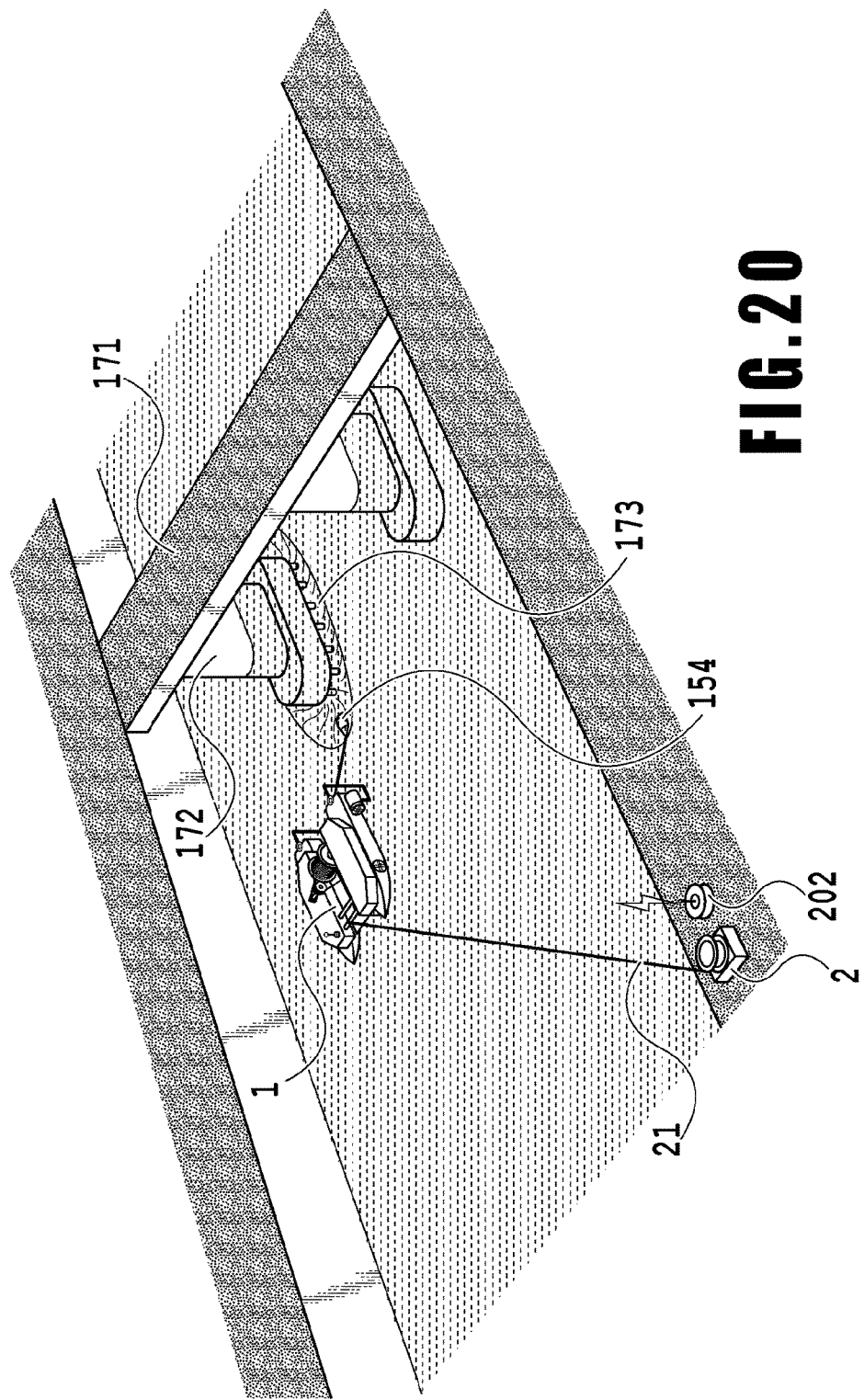
FIG. 20 illustrates an example in which the pier scour is observed by the apparatus of FIG. 18.

FIG. 20 illustrates example tasks of inspection of a scour part around a pier foundation by using the above system with sonar and underwater camera shown in FIG. 18. The unmanned surface vehicle 1 connected to the wire 21 fed and wound from the mooring device 2 includes a towed underwater camera 154 and communicates a communication system 211 on land. The towed underwater camera 154 observes a scour situation 173 of a pier base foundation 172 of a bridge 171.

An Example in which a Rudder Driving Unit Uses a Worm Gear

Figure 21A:
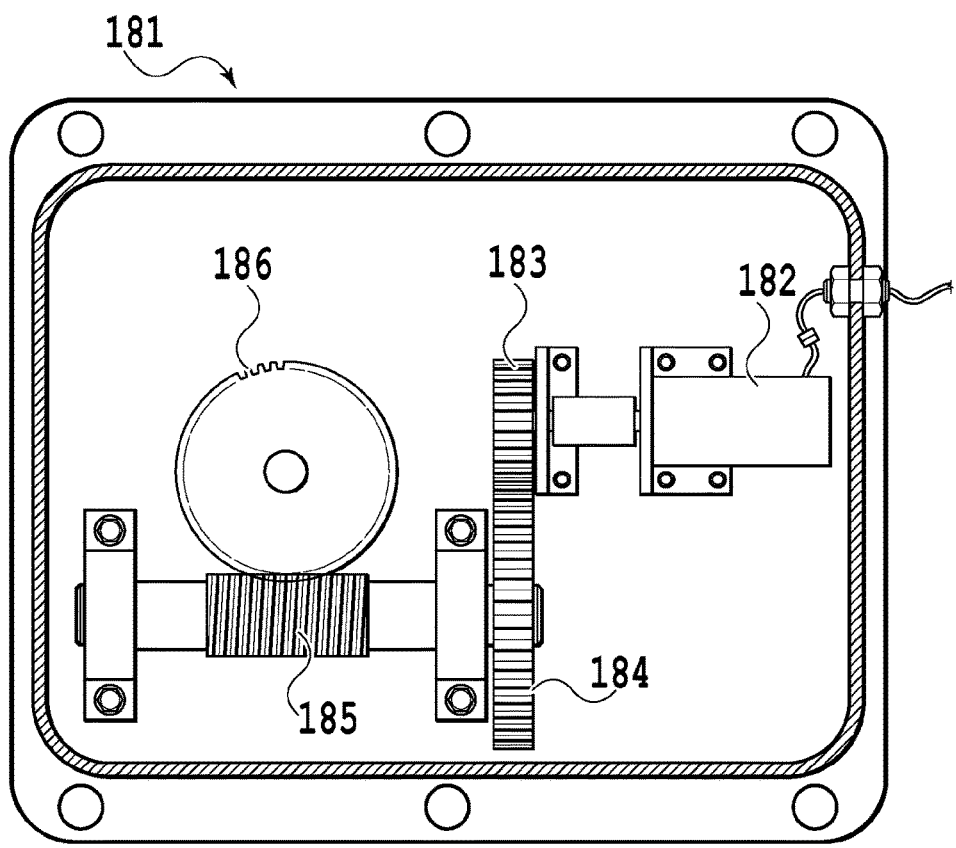
FIG. 21A, and FIG. 21B illustrate an example of a worm and a worm gear used in the rudder driving system of the present invention.
Figure 21B:
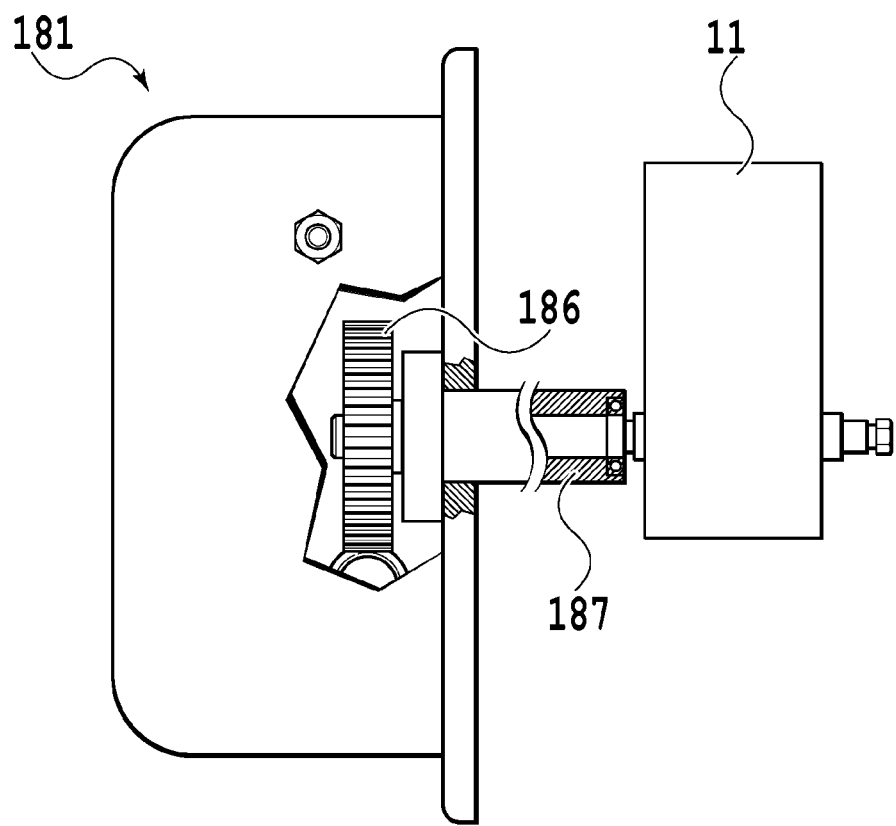

FIG. 21A and FIG. 21B illustrate an example in which the rudder driving unit of the present invention uses a worm and a worm wheel (worm gear). The rudder driving unit 181 controls a driving motor 182 to rotate the worm 185 via spur gear 183, 184. The shaft of the worm wheel 186 is connected to the rudder 11 through a flange 187. This rudder driving unit 181 is mounted on the unmanned surface vehicle 1. The rudder angle is mechanically locked by self-locking effect of the worm gear used in the rudder driving unit. Thus, the rudder withstands the external force without rotating even when the rudder is not actuated. Therefore, the rudder driving unit suppresses the power consumption especially when the rudder angle of the unmanned surface vehicle 1 is kept constant in the running water.

The use of the system of the present invention can reduce disturbance caused by the thruster driving because the system can control the position of the unmanned surface vehicle 1 without using thruster during the underwater observation. This system can be generally used for the underwater observation of a river or a weir for example.

What is claimed is:

1. A position control system for an unmanned surface vehicle, comprising:
   at least one mooring device fixed on the ground;
   a wire fed and wound from the mooring device;
   an unmanned surface vehicle connected at the tip end of the wire; and
   at least one rudder equipped on the unmanned surface vehicle,
   wherein the mooring device includes a first processor for controlling the feeding and winding of the wire and a first communication system,
   the unmanned surface vehicle includes a GPS and an inertia measurement unit for sensing the position and posture of the unmanned surface vehicle, a second processor for drive-controlling the rudder, and a second communication system, and
   the first and second processors send and receive information with each other via the first and second communication systems, such that
   the position of the unmanned surface vehicle is controlled to reach the target.

2. The position control system according to claim 1, wherein the total number of the mooring devices and the rudders is three or more, such that the posture of the unmanned surface vehicle is controlled to reach the target.

3. The position control system according to claim 1, further comprising at least one of the following three mechanisms:
   a wire connection point (WCP) shifting mechanism of that can shift a wire connection point between the wire and the unmanned surface vehicle,
   a center of gravity (COG) shifting mechanism that can shift the COG of the unmanned surface vehicle, and
   a rudder shifting mechanism that can shift a position of the rudder,
   such that the posture of the unmanned surface vehicle is controlled to reach the target.

4. The position control system according to claim 1, wherein the number of the mooring device fixed on the ground is one, the number of the rudders is two, and the two rudders are equipped at a stern side or one rudder is provided at the stern side and the other one rudder is equipped at a bow side, such that the posture of the unmanned surface vehicle is controlled to reach the target.

5. The position control system according to claim 1, wherein the second processor controls a rudder driving unit that includes a worm gear to drive-control the rudder, such that the posture of the unmanned surface vehicle is controlled to reach the target.

6. The position control system according to claim 1, wherein the unmanned surface vehicle further includes a thruster, such that the posture of the unmanned surface vehicle is controlled to reach the target.

7. A position control method of controlling a position of an unmanned surface vehicle in a position control system including, at least one mooring device fixed on the ground, a wire fed and wound from the mooring device, an unmanned surface vehicle connected at the tip end of the wire, and at least one rudder equipped on the unmanned surface vehicle, the position control method comprising:
   feeding and winding, by a first processor of the mooring device, the wire so that the length of the wire becomes a predetermined length calculated from the target position of the unmanned surface vehicle, and
   drive-controlling, by a second processor of the unmanned surface vehicle, the rudder to control the position of the unmanned surface vehicle to reach the target.

8. The position control method according to claim 7, wherein the total number of the mooring devices and the rudders is three or more, such that a posture of the unmanned surface vehicle is controlled to reach the target.

9. The position control method according to claim 7, wherein the unmanned surface vehicle further includes at least one of the following three mechanisms:
   a WCP shifting mechanism that can shift a wire connection point between the wire and the unmanned surface vehicle, a COG shifting mechanism that can shift the center of gravity of the unmanned surface vehicle, and a rudder shifting mechanism that can shift a position of the rudder, such that a posture of the unmanned surface vehicle is controlled to reach the target.

* * * * *